US012280594B2

(12) United States Patent
Nielsen et al.

(10) Patent No.: US 12,280,594 B2
(45) Date of Patent: Apr. 22, 2025

(54) FLUID EJECTION WITH EJECTION ADJUSTMENTS

(71) Applicant: HEWLETT-PACKARD DEVELOPMENT COMPANY, L.P., Spring, TX (US)

(72) Inventors: Jeffrey A. Nielsen, Corvallis, OR (US); Matthew David Smith, Corvallis, OR (US); Roberto A. Pugliese, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 150 days.

(21) Appl. No.: 17/603,475

(22) PCT Filed: Sep. 30, 2019

(86) PCT No.: PCT/US2019/053886

§ 371 (c)(1),
(2) Date: Oct. 13, 2021

(87) PCT Pub. No.: WO2021/066805

PCT Pub. Date: Apr. 8, 2021

(65) Prior Publication Data

US 2022/0194078 A1 Jun. 23, 2022

(51) Int. Cl.
*B41J 2/045* (2006.01)

(52) U.S. Cl.
CPC ......... *B41J 2/04508* (2013.01); *B41J 2/0458* (2013.01); *B41J 2/04581* (2013.01)

(58) Field of Classification Search
CPC .................................................... B41J 2/04528
See application file for complete search history.

(56) References Cited

U.S. PATENT DOCUMENTS

| | | | | |
|---|---|---|---|---|
| 6,380,861 | B2 | 4/2002 | Estelle et al. | |
| 6,637,874 | B2 * | 10/2003 | Yazawa | B41J 2/16532 347/86 |
| 6,832,828 | B2 | 12/2004 | Silverbrook | |
| 6,945,638 | B2 | 9/2005 | Teung et al. | |
| 7,258,839 | B2 | 8/2007 | Gilbert et al. | |
| 2003/0152130 | A1 * | 8/2003 | Heine | H01L 21/67248 374/100 |
| 2006/0017774 | A1 * | 1/2006 | Beak | B41J 2/14072 347/44 |
| 2009/0066005 | A1 | 3/2009 | Maddux | |

(Continued)

FOREIGN PATENT DOCUMENTS

| | | | |
|---|---|---|---|
| DE | 19743804 | | 4/1999 |
| EP | 1182037 | A1 | 2/2002 |
| ES | 2356777 | T3 | 4/2011 |

*Primary Examiner* — Shelby L Fidler
(74) *Attorney, Agent, or Firm* — Foley & Lardner LLP

(57) ABSTRACT

In one example in accordance with the present disclosure, a fluid ejection system is described. The fluid ejection system includes a frame to retain a number of fluid ejection devices. Each fluid ejection device includes a reservoir disposed on a first side of the frame and a fluid ejection die disposed on an opposite side of the frame. Each fluid ejection die includes 1) a fluid feed slot formed in a substrate to receive fluid from the reservoir, 2) an array of nozzles formed in the substrate to eject fluid, and 3) an ejection adjustment system to selectively adjust an amount of fluid ejected from the fluid ejection devices.

9 Claims, 8 Drawing Sheets

(56) References Cited

U.S. PATENT DOCUMENTS

| | | | | |
|---|---|---|---|---|
| 2009/0245835 | A1 | 10/2009 | Campbell | |
| 2011/0221820 | A1* | 9/2011 | Shibata | B41J 29/38 347/17 |
| 2012/0051984 | A1* | 3/2012 | Dudenhoefer | G01N 21/51 356/338 |
| 2013/0155142 | A1* | 6/2013 | Browning | B41J 2/04563 347/19 |
| 2014/0193309 | A1* | 7/2014 | Still | B01L 3/0268 422/500 |
| 2016/0009085 | A1* | 1/2016 | Chen | B41J 2/1601 264/275 |
| 2018/0086077 | A1* | 3/2018 | Yokoyama | B41J 2/14233 |
| 2018/0147841 | A1* | 5/2018 | Clark | B41J 2/0458 |

* cited by examiner

FLUID EJECTION WITH EJECTION ADJUSTMENTS

BACKGROUND

An assay is a process used in laboratory medicine, pharmacology, analytical chemistry, environmental biology, and molecular biology to assess or measure the presence, amount, or functional activity of a sample. The sample may be a drug, a genomic sample, a proteomic sample, a biochemical substance, a cell in an organism, an organic sample, or other inorganic and organic chemical samples. In general, an assay is carried out by dispensing small amounts of fluid into multiple wells of a titration plate. The fluid in these wells can then be processed and analyzed. Such assays can be used to enable drug discovery as well as facilitate genomic and proteomic research.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
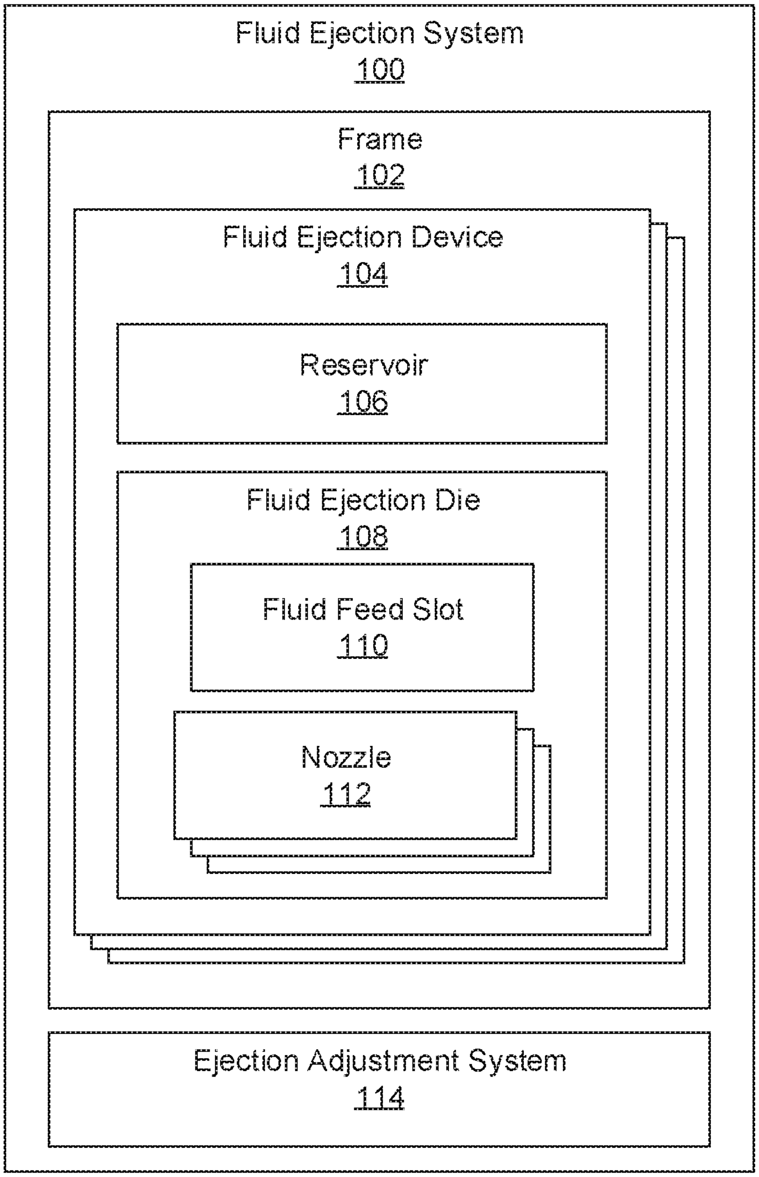
FIG. 1 is a block diagram of a fluid ejection system for ejection adjustments based on ejection characteristics, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An assay is a process used in laboratory medicine, pharmacology, analytical chemistry, environmental biology, and molecular biology to assess or measure the presence, amount, or functional activity of a sample.

Such assays have been performed manually. That is, a user fills fluid into a single channel pipette, or a multi-channel pipette, and manually disperses a prescribed amount of fluid from the pipette into various wells of a titration plate.

As this process is done by hand, it is tedious, complex, and inefficient. Moreover, it is prone to error as a user may misalign the pipette with the wells of the titration plate and/or may dispense an incorrect amount of fluid. Still further, such manual deposition of fluid may be incapable of dispensing low volumes of fluid, for example in the picoliter range.

Moreover, research entities are under constant pressure to increase efficiency while reducing costs. Accordingly, the present specification describes a microfluidic chip-based system which enables fluid-based experiments to be conducted using much smaller quantities of fluid than used in titer plate-based experiments. These small volumes reduce the amount of chemicals used, which can be expensive and also reduce the amount of patient sample used, thus making sample collection easier and less intrusive. A microfluidic chip-based system also results in a reduction in the amount of waste generated, and in some cases a reduction in the time for processing, for example such as when temperature cycling of a sample is performed.

Some arrays of microwells are filled by moving a single nozzle from one or more printheads relative to the array, or by using groups of nozzles from each printhead that are spatially matched to the array spacing. By using several nozzles across several printheads in an array to be dispensed simultaneously, microwells on a microfluidic chip can be filled quickly. This is particularly relevant when hundreds or thousands of wells are to be filled.

However, one complication of such a microfluidic chip-based system is found in transitioning fluids from macro-fluidic vials and pipettes to the microfluidic chip. Accordingly, the present specification implements inkjet-based technology for dispensing operations in life science and other applications. Inkjet-based systems can enable this transition by starting with microliters of fluid and then dispensing picoliters or nanoliters of fluid into specific locations on the microfluidic chips. These dispense locations can be either specific target locations on a chip surface or can be cavities, microwells, channels, or indentations into the chip. In some examples, there are tens, hundreds, or even thousands of dispense locations on a microfluidic chip, in which many tests can be performed using small quantities of fluid.

In such a system, it is desirable that an even amount of fluid is dispensed into every microwell. That is, in any given scenario, variation may exist between either an amount of fluid ejected from a fluid die and/or the amount of fluid deposited on a substrate location. A variety of methods for accounting for this variation exist. For example, a user may simply accept higher variation. However, this variation results in a worse signal/noise ratio. Accordingly, there may be a higher likelihood of error, especially of a false negative, based on this increased variation.

In another example, to compensate for variation in drop volume between nozzles or for variation in drop volume over time, other systems have varied the number of drops dispensed by different nozzles. While dispensing a different number of drops from each nozzle is one method of ensuring uniformly dispensed volumes, this implements more complex circuitry and control.

Accordingly, the present specification describes a system and method that enhance the volumetric consistency of the nozzles themselves. That is, the present specification describes an approach to enabling more precise volumetric accuracy in ejection systems with multiple fluid ejection die on a single printhead or systems with multiple fluid ejection die on multiple printheads. The fluid ejection system of the present specification enables consistent dispense and does so in a variety of ways.

The present system, rather than adjusting the number of drops dispensed to compensate for drop volume variation between various nozzles, uses several energy-based methods to reduce the nozzle-to-nozzle variation in dispensed drop volume in the system.

The system of the present specification also increases a throughput for low volume dispensing applications and allows dispensing of fluids into multiple wells of a titration plate. That is, the fluid ejection system includes multiple fluid ejection devices arranged in an array, which fluid ejection devices use fluid actuators to eject small amounts of fluid into multiple wells of a microfluidic chip plate or another substrate surface. Such a system can operate to eject low, for example in the picoliter range, volumes of fluid into one or multiple wells at a time.

Specifically, the present specification describes a fluid ejection system. The fluid ejection system includes a frame to retain a number of fluid ejection devices and the number of fluid ejection devices disposed on the frame. Each fluid ejection device includes a reservoir disposed on a first side of the frame and a fluid ejection die disposed on an opposite side of the frame. Each fluid ejection die includes a fluid feed slot formed in a substrate to receive fluid from the reservoir and an array of nozzles formed in the substrate to eject fluid. The fluid ejection system also includes an ejection adjustment system to selectively adjust an amount of fluid ejected from the fluid ejection devices.

The present specification also describes a method. For each of a number of fluid ejection devices, fluid is guided from a reservoir on a first side of the frame to a fluid ejection die on an opposite side of the frame. Ejection characteristics are detected for a particular ejection event and adjusted for subsequent ejection events.

In another example, the fluid ejection system includes a frame to retain a number of fluid ejection devices and a two-dimensional array of fluid ejection devices disposed on the frame. In this example, each fluid ejection device includes an open reservoir disposed on a first side of the frame and a fluid ejection die disposed on an opposite side of the frame. Each fluid ejection die includes 1) a fluid feed slot formed in a substrate to receive fluid from the reservoir, 2) an array of nozzles formed in the substrate in rows on either side of the fluid feed slot, 3) at least one sensor formed in the substrate to detect a temperature of the portion of the substrate that corresponds to the fluid ejection die, and 4) at least one heater formed in the substrate on either end of the fluid feed slot to heat the portion of the substrate that corresponds to the fluid ejection die such that fluid ejection from the fluid ejection device matches fluid ejection from other fluid ejection devices.

Such systems and methods 1) improve nozzle-to-nozzle dispensing accuracy of a sample, 2) reduces signal noise; 3) improves sensitivity of the system, which may be relevant in diagnostic applications; and 4) provides finer adjustments to ejection characteristics.

As used in the present specification and in the appended claims, the term, "controller" refers to various hardware components, which includes a processor and memory. The processor includes the hardware architecture to retrieve executable code from the memory and execute the executable code. As specific examples, the controller as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Turning now to the figures, FIG. 1 is a block diagram of a fluid ejection system (100) for ejection adjustments based on ejection characteristics, according to an example of the principles described herein. In general, the fluid ejection system (100) ejects fluid onto a surface. As described above, the surface may be a microfluidic chip with thousands of open nano-wells each with a volume on the nanoliter scale, and the fluid may be deposited into the individual wells of the microfluidic chip. A variety of fluids may be deposited. For example, the fluid ejection system (100) may be implemented in a laboratory and may eject biological fluid. In some examples, the biological fluid may include solvent or aqueous-based pharmaceutical compounds, as well as aqueous-based biomolecules including proteins, enzymes, lipids, antibiotics, mastermix, primer, DNA samples, cells, or blood components, all with or without additives, such as surfactants or glycerol. To eject the fluid, a fluid ejection controller passes control signals and routes them to fluid ejection devices (104) of the fluid ejection system (100).

While specific reference is made to deposition of fluid into wells of a microfluidic chip, the present systems and devices can be used to deposit fluid on other substrates or surfaces such as microscope slides, matrix assisted laser desorption/ionization (MALDI) plates, and titration plates among other substrates or surfaces.

The fluid ejection system (100) includes a frame (102) to retain a number of fluid ejection devices (104). In some examples, the fluid ejection devices (104), or at least the reservoirs (106) of the fluid ejection devices (104), are integrated into the frame (102). That is, the frame (102) may be injection molded or otherwise formed of a thermoplastic material. In this example, depressions may be formed which correspond to the reservoirs (106) that hold the fluid to be ejected.

The fluid ejection system (100) includes a number of fluid ejection devices (104) disposed in the frame (102). A fluid ejection device (104) is a device that operates to eject fluid onto a surface, such as a well of a microfluidic chip. In some cases, the fluid ejection devices (104) operate to dispense picoliter quantities of a target fluid into the wells. For example, the fluid ejection devices (104) may have nozzles that eject between 5 to 300 picoliters of a given fluid per ejection event.

Each fluid ejection device (104) includes a reservoir (106) disposed on a first side of a frame (102). The reservoir (106) holds the fluid to be ejected. In some examples, the reservoir (106) is open, or exposed, so that a user, either manually or via a machine-operated multi-channel pipette, can fill the reservoirs (106) with the target fluid.

Each fluid ejection device (104) also includes a fluid ejection die (108) disposed on an opposite side of the frame (102). That is, a fluid ejection die (108) may be paired with a reservoir (106) to be referred to as a fluid ejection device (104). The fluid ejection die (108) is fluidly coupled to the reservoir (106). That is, during operation, fluid from the reservoir (106) is passed to a fluid ejection die (108) where it is ejected onto a surface.

In some examples, the fluid ejection dies (108) and fluid ejection devices (104) rely on inkjet technology to eject fluid therefrom. Such a fluid ejection system (100), by using inkjet components such as ejection chambers, openings, and actuators disposed within the micro-fluidic ejection chambers, enables low-volume dispensing of fluids such as those used in life science and clinical applications. Examples of such applications include compound secondary screening, enzyme profiling, dose-response titrations, polymerase chain reaction (FOR) miniaturization, microarray printing, drug-drug combination testing, drug repurposing, drug metabolism and pharmacokinetics (DMPK) dispensing and a wide variety of other life science dispensing.

The fluid ejection die (108) includes a number of components to eject fluid. For example, each fluid ejection die (108) includes an array of nozzles (112) in the substrate to eject a fluid. Each nozzle (112) includes a number of components. For example, a nozzle (112) includes an ejection chamber to hold an amount of fluid to be ejected, an opening through which the amount of fluid is ejected, and a fluid actuator disposed within the ejection chamber to eject the amount of fluid through the opening.

Turning to the fluid actuators, the fluid actuator may include a firing resistor or other thermal device, a piezoelectric element, or other mechanism for ejecting fluid from the ejection chamber. For example, the fluid actuator may be a firing resistor. The firing resistor heats up in response to an applied voltage. As the firing resistor heats up, a portion of the fluid in the ejection chamber vaporizes to generate a bubble. This bubble pushes fluid out the opening and onto the print medium. As the vaporized fluid bubble pops, fluid is drawn into the ejection chamber from a passage that connects nozzle to the fluid feed slot (110) in the fluid ejection die (108), and the process repeats. In this example, the fluid ejection die (108) may be a thermal inkjet (TIJ) fluid ejection die (108).

In another example, the actuator may be a piezoelectric device. As a voltage is applied, the piezoelectric device changes shape which generates a pressure pulse in the ejection chamber that pushes the fluid out the opening and onto the print medium. In this example, the fluid ejection die (108) may be a piezoelectric inkjet (PIJ) fluid ejection die (108).

Each fluid ejection die (108) includes a fluid feed slot (110) formed in a substrate. The fluid feed slot (110) receives fluid from the reservoir (106) and guides the fluid to the nozzles (112) of the fluid ejection die (108). Each nozzle (112) of the array is coupled to the fluid feed slot (110) via a fluid channel. The fluid channel receives fluid from the fluid feed slot (110) and passes it to the ejection chamber of the nozzle (112).

The fluid ejection system (100) also includes an ejection adjustment system (114) to selectively adjust an amount of fluid ejected from the fluid ejection devices (104). As described above, different ejection characteristics may lead to uneven ejection of fluid from the nozzles (112) in the array. As one particular example, an environmental temperature may impact a size of a drive bubble, which drive bubble as described above pushes fluid from the nozzles (112). Accordingly, if a portion of a substrate is at a higher temperature than another portion, the nozzles (112) on the portion with the increased temperature will form larger bubbles as compared to the nozzles (112) on a cooler portion of the substrate. The size of the drive bubble effects how much fluid is ejected from the nozzle (112) such that these differently-sized drive bubbles lead to different amounts of fluid being deposited on a surface, Differences in amounts of fluid deposited on the substrate may skew the results of any downstream analysis. Accordingly, the ejection adjustment system (114) accounts for these variations by adjusting the amount of fluid ejected from the different fluid ejection devices (104). In some examples, this is done to reduce a difference of the amount of fluid ejected by each of the fluid ejection devices (104).

The ejection adjustment system (114) makes such adjustments in a variety of ways. For example, as described above, one source of drop volume variation is from variation in silicon temperature between the ends of fluid ejection die (108) and the middle of the fluid ejection die (108), with the middle of the fluid ejection die (108) generally being warmer. In general, this temperature difference results from excess heat from the fluid ejection process dissipating non-uniformly into the rest of the substrate. Nozzles (112) near the middle are surrounded by other warm nozzles (112). By comparison, nozzles (112) near the edge have warm nozzles (112) just on one side and cold silicon on the other side. Accordingly, edge nozzles (112) have a better heat sink available to them. The ejection adjustment system (114) in this example, uses end-of-die heater/sensor pairs to enable extra heat to be applied to the ends of the fluid ejection die (108).

Accordingly, by comparing the temperature at the ends of the fluid ejection die (108) to the global temperature of the silicon, extra energy can be applied to the ends of the fluid ejection die (108) to better match the temperature at these locations with the temperature of the rest of the silicon. In one particular example of this environment, at least one sensor is located near the center of the fluid ejection die (108). This enables a temperature comparison to end-of-die sensors so that energy can be applied to the end-of-die heaters to match the temperature at the middle of the fluid ejection die (108), and thus make drop volume more uniform between end-of-die nozzles (112) and center-of slot nozzles (112). While specific reference is made to adjustments to nozzles (112) within a single fluid ejection die (108), similar adjustments may be made to entire fluid ejection die (108), relative to other fluid ejection die (108) on a shared substrate.

In another example, the ejection adjustment system (114) adjusts the delivered energy. This may be done in a variety of ways. For example, the ejection adjustment system (114) may adjust the pulse width passed to fluid actuators based on this temperature difference. That is, slight adjustments in dispensed volume can be realized in thermal inkjet nozzles (112) by applying different activation pulses to each nozzle (112). Nozzles (112) receiving longer firing or precursor pulses will have more energy and will form a larger drop. Accordingly, in such a system, longer pulses can be applied to the colder regions of the printhead, i.e., the fluid ejection die (108) at the end, and shorter pulses can be applied to the warmer regions of the printhead, i.e., the fluid ejection die (108) near the center of the printhead.

In another example, the ejection adjustment system (114) adjusts the delivered energy by adjusting the voltage supplied. Within a fluid ejection die (108), it may not be the case that voltage is adjusted from nozzle (112) to nozzle (112), but such adjustments may be made between fluid ejection die (108) on a multi-die carrier.

In yet another example, the ejection adjustment system (114) uses a combination of end-of-die heating and delivered energy modulation to make the drop volume more uniform from nozzle (112) to nozzle (112) on the printhead. In yet another example, a fluid ejection system (100) with printheads with multiple fluid ejection die (108) compares the temperature between fluid ejection die (108) and adjusts either the energy applied to heaters, the pulse widths, or the voltage applied to compensate for die-to-die differences in temperature. As described above, in fluid ejection systems (100) with long and skinny printheads with multiple fluid ejection die (108) down the length of the printhead, the end fluid ejection die (108) will tend to be colder than the fluid ejection die (108) in the middle of the printhead, which without the compensations described herein may lead to non-uniform fluid deposition on the target substrate.

Such adjustments may be made between fluid ejection die (108) on a single printhead, and can also be made between fluid ejection die (108) on different printheads on a cassette. That is, an ejection adjustment system (114) coupled to a fluid ejection system (100) with multiple printheads on a dispense cassette compares variation in substrate temperature from printhead to printhead and applies the above described techniques to a colder printhead to reduce a temperature difference between different printheads, thus increasing deposition uniformity. Such a system is particularly useful in systems where some printheads are dispensing more fluid than other printheads, or are dispensing at a higher frequency, and thus will tend to be warmer.

Such a fluid ejection system (100) allows for finer adjustments to correct for nozzle-to-nozzle variation. For example, other systems may adjust the number of drops being fired based on predicted differences in drop volume. However, these adjustments may be in discrete integer number of drops. For example, if the desired total volume to be dispensed into a well is 200 picoliters (pL), one nozzle (112) dispenses 20 pL drops, and another nozzle (112) dispenses 21 pL drops, then 10 drops can be dispensed from the first nozzle (112) yielding 200 pL, and either 9 or 10 drops can be dispensed from the second nozzle (112) yielding either 189 pL or 210 pL. The described fluid ejection system (100) with the ejection adjustment system (114) can use temperature, pulse width, and/or applied voltage to provide finer adjustments to decrease the volume size and bring greater uniformity to fluidic ejection.

Figure 2:
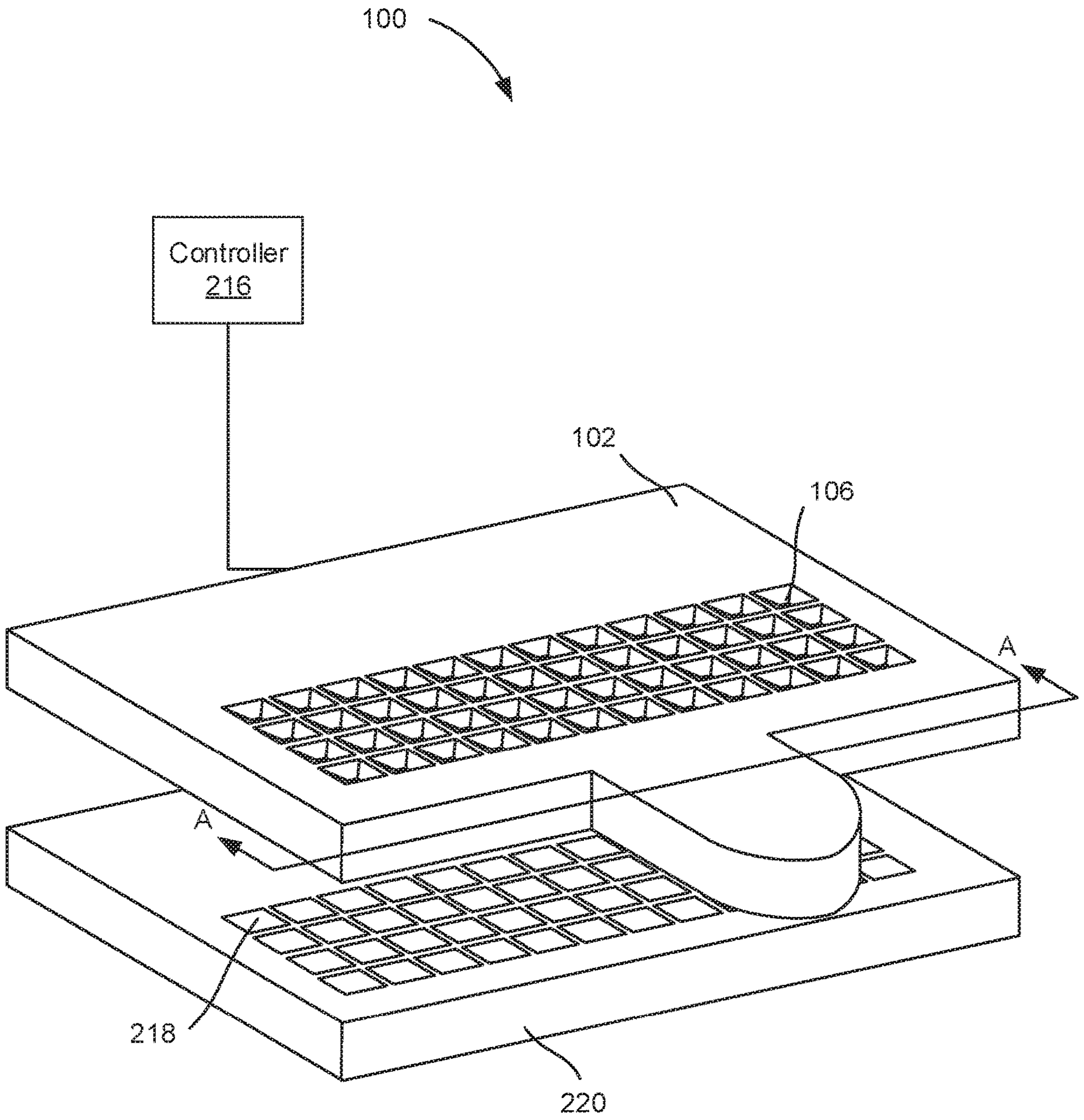
FIG. 2 is an isometric view of a fluid ejection system for ejection adjustments based on ejection characteristics, according to an example of the principles described herein.

FIG. 2 is an isometric view of a fluid ejection system (100) for ejection adjustments based on ejection characteristics, according to an example of the principles described herein. As described above, the fluid ejection system (100) includes a frame (102) to hold fluid ejection devices (FIG. 1, 104), which fluid ejection devices (FIG. 1, 104) may be arranged in a two-dimensional array. As described above, a fluid ejection device (FIG. 1, 104) refers to a pairing of a reservoir (106) and a fluid ejection die (FIG. 1, 108). The frame (102) may be formed of any material, such as a plastic. In one specific example, the frame (102) is an epoxy mold compound and is injection-molded.

The top of the fluid ejection system (100) includes reservoirs (106), which may be exposed such that fluid can be dispensed therein without having to remove a cap. That is, a user may insert fluid directly into the reservoir (106) using a single-channel or multi-channel pipette. For simplicity, one reservoir (106) is indicated with a reference number. In some examples, the number of reservoirs (106) align with the number of regions (218) on a substrate (220). Again, for simplicity, one region (218) is identified with a reference number.

During fluid ejection, the fluid ejection system (100) is disposed above the substrate (220) such that fluid expelled from the fluid ejection system (100) is deposited in regions (218) of the substrate (220). As described above, the substrate (220) may be a microfluidic chip with hundreds, or even thousands, of wells. For example, rather than having just tens or hundreds of wells as in a titer plate, the substrate (220) may have thousands, for example 3,000 of these wells, the wells spread out over various regions (218) that align with corresponding fluid ejection devices (FIG. 1, 104). In this example, each well may have a volume of 30 nanoliters and the fluid in each reservoir (106), i.e., from a single fluid ejection device (FIG. 1, 104) may be ejected into multiple microwells simultaneously. As each well of the microfluidic chip has volumes on the nanoliter scale, the wells may be referred to as nano-wells and the microfluidic chip may be referred to as a nano-well chip. For example, as depicted in FIG. 2, a microfluidic chip substrate may include 2,400 wells with 50 in each region (218). In this example, the same or different samples may be introduced into the reservoirs (106) and the corresponding nozzles (FIG. 1, 112) may be activated to eject fluid into respective regions (218). After fluid ejection die (FIG. 1, 108) corresponding to each reservoir (106) have been activated, each region (218) may have 50 samples of the fluid, one per well. As described above, while specific reference is made to deposition of a fluid into a microfluidic chip-based substrate (220), the fluid ejection system (100) may deposit fluid onto other surfaces or substrates.

In some examples, the frame (102) also houses circuitry to activate each of the fluid actuators. That is, each of the fluid actuators may be individually addressable and may activate based on control signals from a controller (216). Specifically, the frame (102) includes electrical connections on a top surface of the frame (102). These electrical connections interface with corresponding connections on a controller (216) to pass control signals.

As described above, the fluid ejection system (100) includes an ejection adjustment system (FIG. 1, 114) which includes, in part, a controller (216) to transmit control signals for adjusting an amount of fluid ejected from the fluid ejection devices (FIG. 1, 104). In some examples, other components of the ejection adjustment system (FIG. 1, 114), such as heaters and sensors, may be per-fluid ejection device (FIG. 1, 104), the controller (216) however may be shared by multiple fluid ejection devices (FIG. 1, 104).

During operation, the controller (216) passes control signals to the fluid ejection system (100) via an electrical connection. Any number of control signals may be passed. For example, ejection signals may activate fluid actuators on the fluid ejection devices (FIG. 1, 104) to eject fluid therefrom. Other types of signals include sensing signals to activate a sensor to collect data regarding the fluid ejection device (FIG. 1, 104) or a fluid passing through the fluid ejection device (FIG. 1, 104) may also be transmitted.

While specific reference is made to particular control signals generated and/or passed, any number and type of control signals may be passed to the fluid ejection system (100) by the fluid ejection controller (216). For example, as described above, due to any number of circumstances, nozzles (FIG. 1, 112) of different fluid ejection devices (FIG. 1, 104) may eject different amounts of fluid which may skew analytic results. Accordingly, the controller (216) may not only send a control signal to effectuate fluidic ejection, but may also send an adjusted signal, and may determine the amount of adjustment to make.

For example, a sensor in a fluid ejection device (FIG. 1, 104) may determine that a substrate on which the fluid ejection die (FIG. 1, 108) is disposed has a temperature that is greater than a threshold amount. Accordingly, based on this information, the controller (216) may adjust the pulse width of an activation pulse for the respective fluid ejection die (FIG. 1, 108) to reduce the size of the resultant drive bubble. Such an operation may be done to alter the size of the drive bubble to be consistent with other drive bubbles of the array of fluid ejection devices (FIG. 1, 104), thus resulting in more consistent drop volumes.

In another example, the controller (216), after determining that a substrate of a particular region of a printhead is below a temperature threshold, may turn on a heater to raise the temperature at this region, and also to increase the size of the resultant drive bubble. Such an operation may be done to increase the size of the drive bubble to be consistent with other drive bubbles of the array of fluid ejection devices (FIG. 1, 104), thus resulting in more consistent drop volumes.

A specific example is now presented, in this example, a quantitative polymerase chain reaction (qPCR) operation is carried out. In this example, different fluidic components such as a target sample, mastermix, and/or primers are ejected from the fluid ejection system (100) into regions (218) of the microfluidic chip substrate (220) as described above. In some examples with different compounds being placed in different regions (218) or nano-wells.

After the sample, mastermix, and/or primers have been dispensed into the wells on the microfluidic chip, the microfluidic chip is sealed with either an adhesive film tape or by immersing it in an oil. The entire microfluidic chip is then temperature cycled multiple times to execute the FOR amplification process. After each cycle of this process (usually after 25-30 cycles) then the wells are measured, usually looking for a florescent tag. By looking at the curve of increased amplification, a quantification of the amplification process is determined, enabling a measurement of the amount of genetic material of interest that was present in the starting sample.

As described above, inconsistent drop volumes can lead to variation in the amount of sample or primer used, which can lead to variation in the quantification process of the qPCR. Variation in the sample in the well leads to variation and uncertainty in the results. Accordingly, by increasing drop volume uniformity, the present fluid ejection system (100) alleviates such inconsistency thereby enhancing the precision and reliability of the results.

Figure 3:
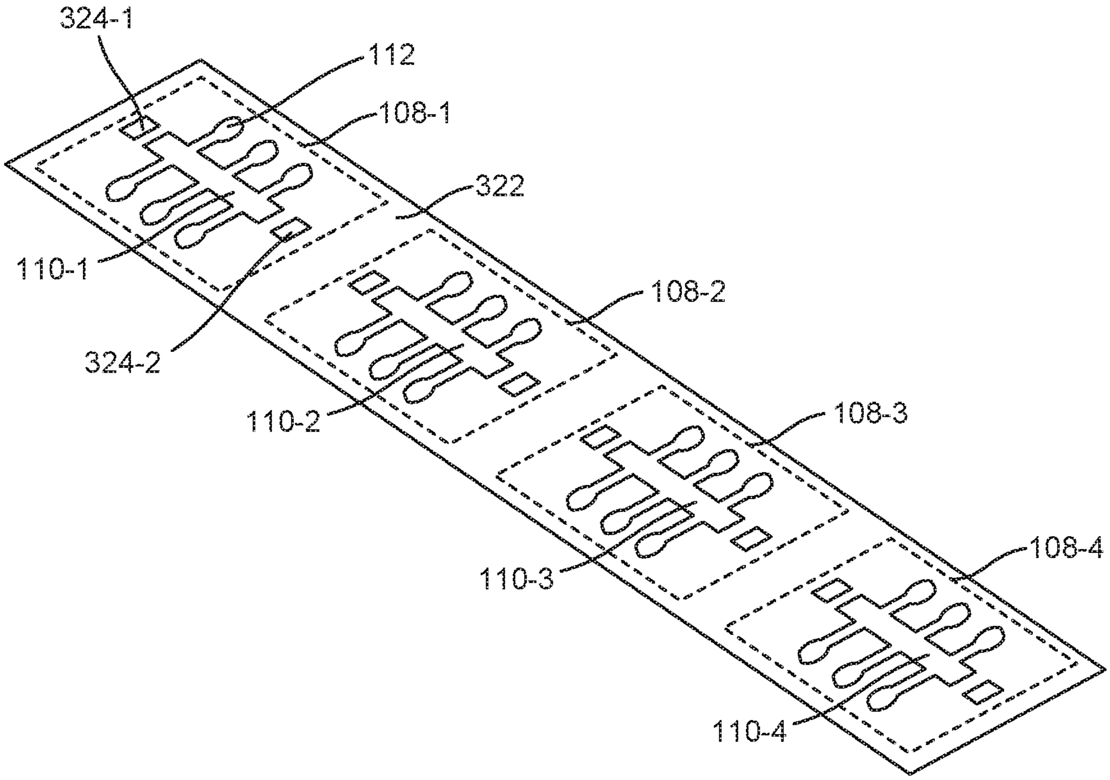
FIG. 3 is a cross-sectional view of fluid ejection die of a fluid ejection system, according to an example of the principles described herein.

FIG. 3 is a cross-sectional view of a fluid ejection die (108) of a fluid ejection system (100), according to an example of the principles described herein. Specifically, FIG. 3 is a cross-sectional view of one "column" taken along the line A-A in FIG. 2.

As used in the present specification and in the appended claims, the term "printhead" may refer to an individual substrate (322) and the components disposed thereon. Further, the term "fluid ejection die" may refer to a portion of the printhead that corresponds to one fluid ejection device (FIG. 1, 104). In other words, multiple fluid ejection die (108) are formed on a single printhead, Specifically, as depicted in FIG. 3, four fluid ejection die (108-1, 108-2, 108-3, 108-4), corresponding to four fluid ejection devices (FIG. 1, 104) and four reservoirs (FIG. 1, 106) are formed on a single printhead.

Each fluid ejection die (108) is formed on a substrate (322). That is, different components, such as the fluid slot (110), nozzles (112), and channels coupling the two are formed in a rigid substrate (322). This substrate (322) may be a silicon wafer. The substrate (322) may be sandwiched between a bottom half of the plastic frame (102) and a top half of the plastic frame (102).

In other words, as described above, each fluid ejection device (FIG. 1, 104) includes a reservoir (FIG. 1, 106) on a first side of the frame (FIG. 1, 102), which reservoirs (FIG. 1, 106) may be open. The fluid ejection devices (FIG. 1, 104) each also include a fluid ejection die (108) on an opposite side of the frame (FIG. 1, 102). Each fluid ejection die (108) includes a fluid feed slot (110) formed in the substrate (322) to receive fluid from the reservoir (FIG. 1, 106). An array of nozzles (112) is fluidly coupled to the fluid feed slot (110), in some examples as rows on either side of the fluid feed slot (110).

Multiple fluid ejection die (108) may be formed on a single substrate (322). For example, FIG. 3 depicts four fluid ejection die (108), which correspond to four reservoirs (FIG. 1, 106), formed on a single substrate (322). That is, multiple fluid ejection devices (FIG. 1, 104) share a single substrate (322). Note that in this example, even though multiple fluid ejection devices (FIG. 1, 104) and fluid ejection die (108) are housed on a single substrate (322), each fluid ejection device (FIG. 1, 104) is still individually addressable, That is, the controller (FIG. 2, 216) can individually indicate which of the fluid ejection device (FIG. 1, 104) ejection characteristics are to be altered to promote drop volume continuity.

As described above, the fluid ejection system (FIG. 1, 100) includes an ejection adjustment system (FIG. 1, 114) which adjusts the amount of fluid ejected from the different fluid ejection die (108) to promote ejection uniformity between the fluid ejection die (108). Accordingly, the fluid ejection system (FIG. 1, 100) includes the controller (FIG. 2, 216) and in some examples includes hardware components on the fluid ejection die (108) to aid in such control.

Specifically, the each fluid ejection device (FIG. 1, 104) includes a sensor formed in the substrate (322) to detect a temperature of a portion of the substrate (322) that corresponds to the fluid ejection device (FIG. 1, 104) and at least one heater in the substrate (322) on either end of the fluid feed slot (110) to heat a portion of the substrate (322) that corresponds to the fluid ejection die (108). This is done to ensure that fluid ejection from the fluid ejection die (108) matches fluid ejection from other fluid ejection die (108).

These components, i.e., the sensor and the heater, may be integrated into a single integrated component (324). In some examples, each fluid ejection die (108) includes an integrated component (324-1, 324-2) at either end of the respective fluid feed slot (110-1). For simplicity in FIG. 3, just a few instances of each component are indicated with a reference number.

As described above, increased temperatures surrounding the nozzles (112) may result in larger drop bubble formation, which ejects a larger amount of fluid. This may be undesirable as it affects ejection uniformity, which could result in imprecise fluid deposition and/or skewed analysis results.

Of particular relevance, nozzles (112) on fluid ejection die (108-2, 108-3) near the center of the column tend to be warmer than nozzles (112) on fluid ejection die (108-1, 108-4) at the end of the column. Still further, with regards to a single fluid ejection die (108), nozzles (112) near the end of the fluid ejection die (108) also tend to be cooler than nozzles (112) near the center of the fluid ejection die (108). Both of these conditions lead to variation in dispensed volume 1) between nozzles (112) at the center and ends of fluid ejection die (108) and 2) between nozzles (112) of end-of-column fluid ejection die (108-1, 108-4) and center-of-column fluid ejection die (108-2, 108-3) with more fluid being deposited in some microwells of a microfluidic chip as compared to others.

Accordingly, sensor/heater integrated components (324) at either end of the fluid ejection die (108) can be used to increase the ejection uniformity between nozzles (112) in one fluid ejection die (108) and also to increase the ejection uniformity between fluid ejection die (108) in a column. In one particular example, nozzles (102) at ends of a fluid ejection die (108) are heated to a greater degree relative to nozzles (112) at an interior portion of the fluid ejection die (108) and fluid ejection die (108) at ends of a substrate (322) are heated to a greater degree relative to fluid ejection die (108) at an interior portion of a substrate (322).

The heaters and sensors may take a variety of forms. In one example, the sensor may be an impedance sensor to detect a presence of a drive bubble. For example, an impedance sensor may be placed adjacent to the firing resistor to measure the extent/timing of the drive bubble event and could use this information to determine differences between the fluid ejection devices and then direct extra heat to areas with smaller drive bubble, run the firing pulse longer in areas with smaller drive bubble, or change the applied voltage to fluid actuators.

In another example, the sensor is a temperature sensor, which may be integrated with the heater in an integrated component (324) as described above. A temperature sensor, whether alone or integrated with a heater indirectly determines drive bubble characteristics, including size as there is a relationship between substrate (322) temperature and drive bubble size, with warmer temperatures resulting in larger drive bubble.

Figure 4:
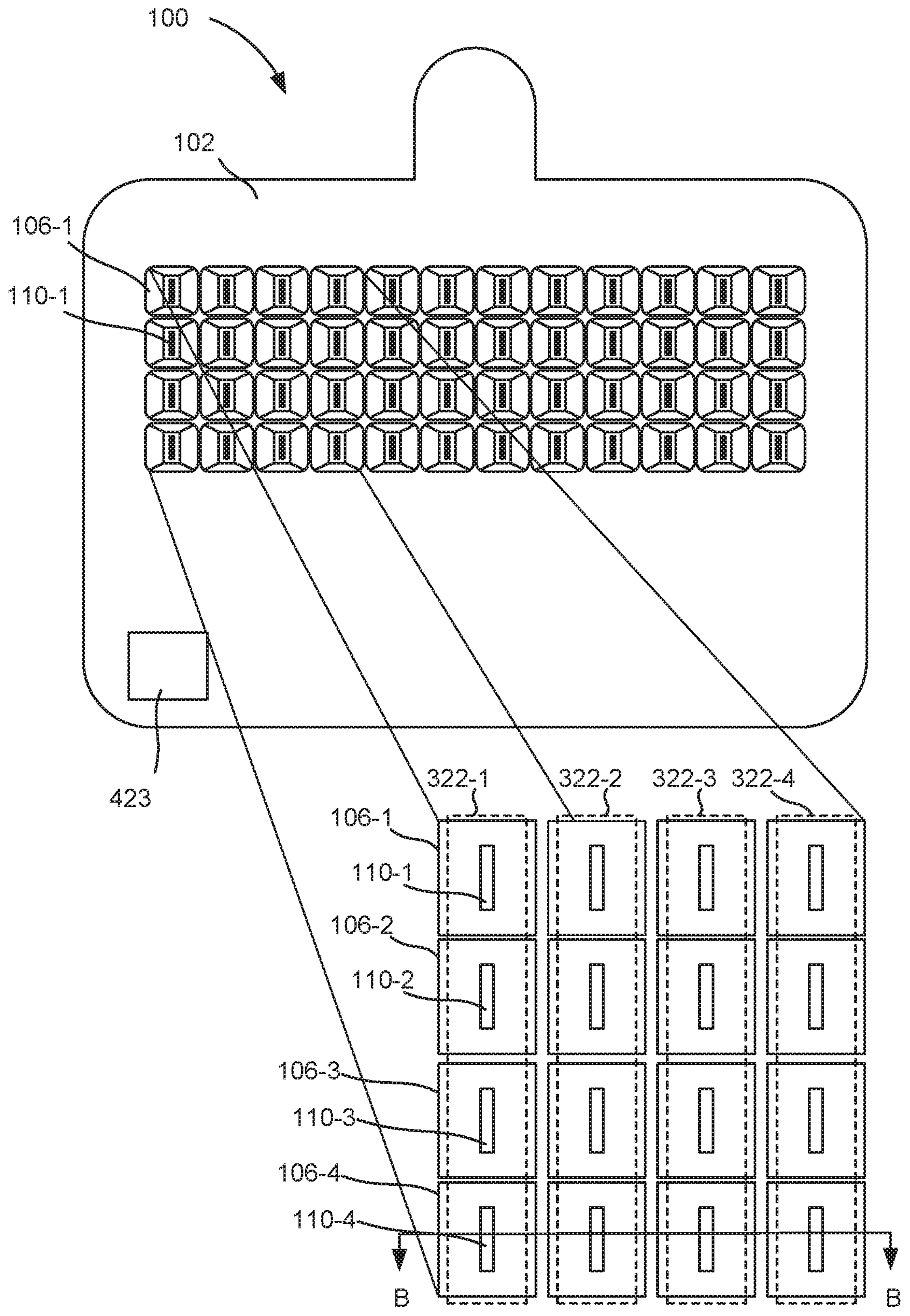
FIG. 4 is a top view of a fluid ejection system for ejection adjustments based on ejection characteristics, according to an example of the principles described herein.

FIG. 4 is a top view of a fluid ejection system (100) for ejection adjustments based on ejection characteristics, according to an example of the principles described herein. As depicted in FIG. 4, the frame (102) houses multiple fluid ejection devices (FIG. 1, 104). In this example, each fluid ejection device (FIG. 1, 104) is a separate structure. FIG. 4 depicts the reservoirs (106) of each fluid ejection device (FIG. 1, 104) and the corresponding fluid slots (110) disposed at the bottom of each reservoir (106). The reservoir (106) is fluidly connected to the slot (110) which is fluidly connected to the nozzles (FIG. 1, 112) of the fluid ejection die (FIG. 1, 108). For simplicity, in FIG. 4 one instance of either component is indicated with a reference number.

As indicated above, multiple reservoirs (106) can be filled simultaneously via a multi-channel pipette. In some examples, each fluid ejection die (FIG. 1, 108) is formed on a substrate (322). That is, different components, such as the fluid slot (110), nozzles (FIG. 1, 112), and channels coupling the two are formed in a rigid substrate (322). This substrate may be a silicon wafer.

As described above, multiple fluid ejection devices (FIG. 1, 104) may share a single substrate (322). For example, FIG. 4 depicts that four fluid ejection devices (FIG. 1, 104), which correspond to the depicted four reservoirs (106-1, 106-2, 106-3, 106-4) and four slots (110-1, 110-2, 110-3, 110-4) on a first substrate (322-1). Similarly, four other fluid ejection devices (FIG. 1, 104) on a second substrate (322-2), four more on a third substrate (322-3), and four more on a fourth substrate (322-4). That is multiple fluid ejection devices (FIG. 1, 104) share a single substrate (322). In FIG. 4, each substrate (322) is represented in dashed lines to indicate its placement underneath respective reservoirs (106).

In some examples, adjustments to promote drop volume continuity are performed within a single substrate (322). For example, temperature measurements for a first fluid ejection device (FIG. 1, 104) corresponding to the first reservoir (106-1) may be taken as are temperature measurements for a second fluid ejection device (FIG. 1, 104) corresponding to a second reservoir (106-2). Based on these measurements, the controller (FIG. 2, 216) may perform a variety of actions including raising the temperature at a respective portion of the substrate (322) and/or altering delivered energy (via pulse width or voltage modulation) for one or both of the fluid ejection devices (FIG. 1, 104) to promote drop volume uniformity.

In some cases, adjustments to promote drop volume continuity may be across substrates (322). For example, temperature measurements for a fluid ejection device (FIG. 1, 104), or fluid ejection devices (FIG. 1, 104), on a first substrate (322-1) may be taken as are temperature measurements for a fluid ejection device (FIG. 1, 104), or fluid ejection devices (FIG. 1, 104), on a second substrate (322-2). Based on these measurements, the controller (FIG. 2, 216) may perform a variety of actions including raising the temperature at a respective portion of a respective substrate (322) and/or altering delivered energy for one or both of the fluid ejection devices (FIG. 1, 104) to promote drop volume uniformity.

FIG. 4 also depicts an ambient temperature sensor (423) that may be used to calibrate the ejection adjustment system (FIG. 1, 100). That is, the ambient temperature sensor (423) may be used to determine an initial value of the fluid ejection die (FIG. 1, 108) temperature. Doing so may trigger preheating and/or recognizing if the environment is too hot to accurately dispense the fluid. The output of the ambient temperature sensor (423) may also be used to calibrate the die temperature such that any readings from the sensors of the fluid adjustment system (FIG. 1, 114) may be properly processed into an accurate ejection characteristic adjustment. In some examples, the calibration value, or another output from the ambient temperature sensor (423) may be stored on memory disposed on the fluid ejection die (FIG. 1, 108) itself or on the frame (102).

Figure 5:
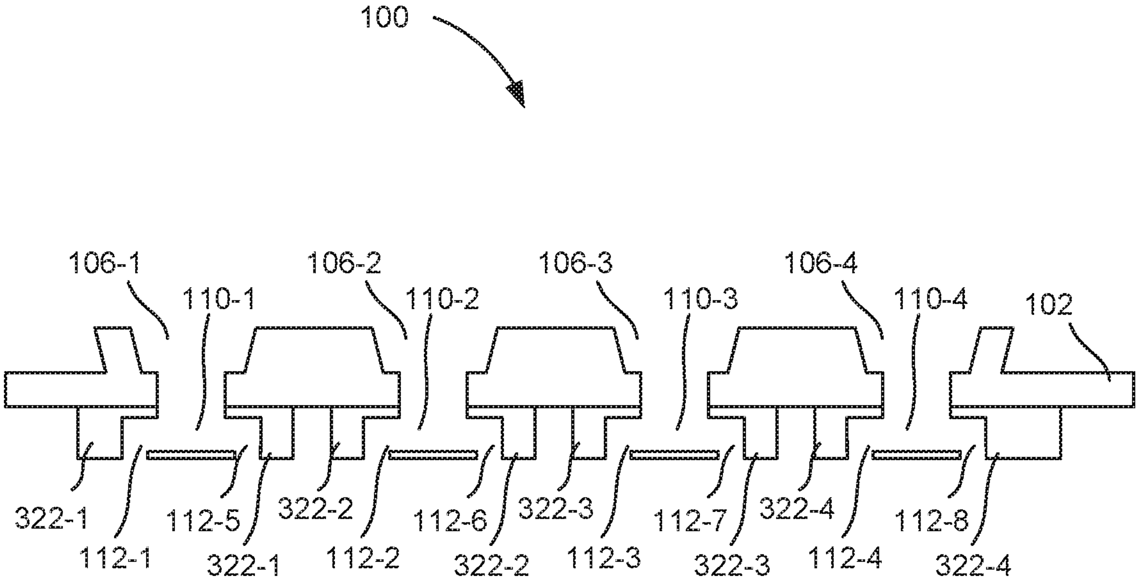
FIG. 5 is a cross-sectional view of a fluid ejection system for ejection adjustments based on ejection characteristics, according to an example of the principles described herein.

FIG. 5 is a cross-sectional view of a fluid ejection system (FIG. 1, 100) for ejection adjustments based on ejection characteristics, according to an example of the principles described herein. Specifically, FIG. 5 is a cross-sectional view taken along the line B-B from FIG. 4. FIG. 5 clearly depicts four reservoirs (106-1, 106-2, 106-3, 106-4) and the slots (110-1, 110-2, 110-3, 110-4) that they are fluidly coupled to. As described above, each slot (110) is formed in its own substrate (322). Specifically, a first slot (110-1) is formed in a first substrate (322-1), a second slot (110-2) is formed in a second substrate (322-2), a third slot (110-3) is formed in a third substrate (322-3), and a fourth slot (110-4) is formed in a fourth substrate (322-4).

FIG. 5 also clearly depicts the nozzles (112) through fluid from the reservoir (106) is passed and ejected. Note that as depicted in FIG. 5, in some examples, the array of nozzles (112) of the fluid ejection die (FIG. 1, 108) may be disposed as columns on either side of a corresponding slot (110). That is two nozzles (112-1, 112-5) correspond to a first fluid ejection die (FIG. 1, 108) that includes a first slot (110-1), two nozzles (112-2, 112-6) correspond to a second fluid ejection die (FIG. 1, 108) that includes a second slot (110-2), two nozzles (112-3, 112-7) correspond to a third fluid ejection die (FIG. 1, 108) that includes a third slot (110-3), and two nozzles (112-4, 112-8) correspond to a fourth fluid ejection die (FIG. 1, 108) that includes a fourth slot (110-4). In each case, a nozzle (112) is fluidly coupled to a slot (110)

via channels. The fluid actuators may be disposed on surfaces that define these channels.

Figure 6:
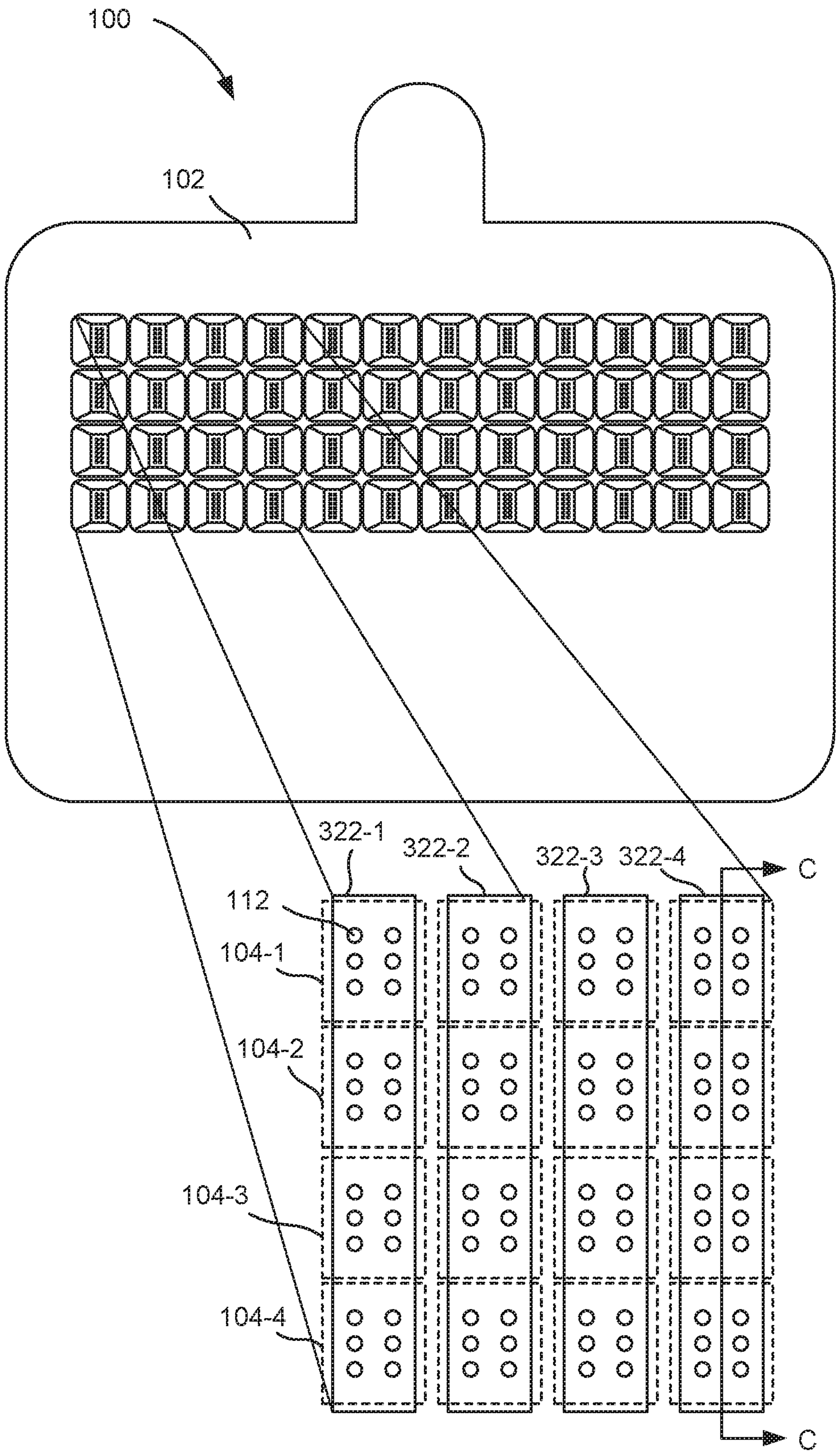
FIG. 6 is a bottom view of a fluid ejection system for ejection adjustments based on ejection characteristics, according to an example of the principles described herein.

FIG. 6 is a bottom view of a fluid ejection system (100) for ejection adjustments based on ejection characteristics, according to an example of the principles described herein. The bottom of the fluid ejection system (100) includes fluid ejection dies (FIG. 1, 108). In one example, each fluid ejection die (FIG. 1, 108), and therefore each fluid ejection device (104), is a separate structure. For simplicity, just a few fluid ejection devices (104) are indicated with a reference number. FIG. 6 also depicts the nozzles (112) that are fluidly connected to the reservoirs (FIG. 1, 106) via a number of slots (FIG. 1, 110), channels, and chambers. That is, fluid is fed, via gravity from the reservoir (FIG. 1, 106) along a flow path to nozzles (112) of a corresponding fluid ejection device (104).

In some examples, the bottom surface of the frame (102) also houses circuitry to activate each of the fluid actuators. That is, each of the fluid actuators may be individually addressable and may activate based on control signals from a controller (FIG. 2, 216). In some examples, rather than having multiple electrical connections, the fluid ejection system (100) includes a single electrical connection to receive signals from the controller (FIG. 2, 216). In this fashion, fluid ejection dies (FIG. 1, 108) can be fired individually, in groups, or all together depending on the application and throughput considerations. By aligning fluid ejection dies (FIG. 1, 108) with wells in the substrate (FIG. 2, 220), exact fluidic ejection is promoted, and multi-plex dispensing from the fluid ejection dies (FIG. 1, 108) is enabled.

Figure 7:
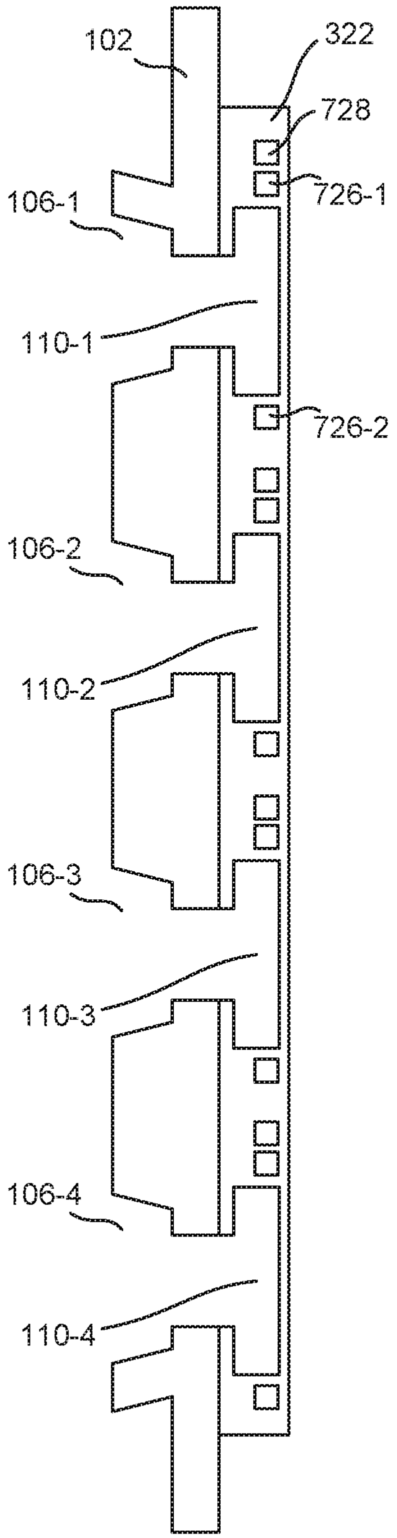
FIG. 7 is a cross-sectional view of a fluid ejection system for ejection adjustments based on ejection characteristics, according to an example of the principles described herein.

FIG. 7 is a cross-sectional view of a fluid ejection system (100) for ejection adjustments based on ejection characteristics, according to an example of the principles described herein. Specifically, FIG. 7 is a cross-sectional view taken along the line C-C in FIG. 6.

FIG. 7 clearly depicts the top side of the frame (102) with the open reservoirs (106) formed therein. FIG. 7 also depicts the fluidic connection to the respective slots (110) that feed fluid to nozzles (FIG. 1, 112) to be ejected.

FIG. 7 also clearly depicts the substrate (322) in which certain components are formed and which constitutes the fluid ejection die (FIG. 1, 108) on the second and opposite side of the frame (102). In the example depicted in FIG. 7, rather than an integrated sensor/heater component (FIG. 3, 324), the sensors (728) and heaters (726-1, 726-2) are separate components. Note that there is still a heater (726-1, 726-2) at each end of the fluid feed slot (110) such that heating can be carried out for nozzles (FIG. 1, 112) within a fluid ejection die (FIG. 1, 108) and/or nozzles (FIG. 1, 112) across fluid ejection die (FIG. 1, 108). However, in this example sensors (728) are placed at different locations along the substrate (322) to determine local temperatures along the substrate (322), which temperatures are input to the ejection adjustment system (FIG. 1, 114) which alters ejection characteristics by, for example, changing substrate (322) temperature or altering energy delivered to fluid actuators.

Figure 8:
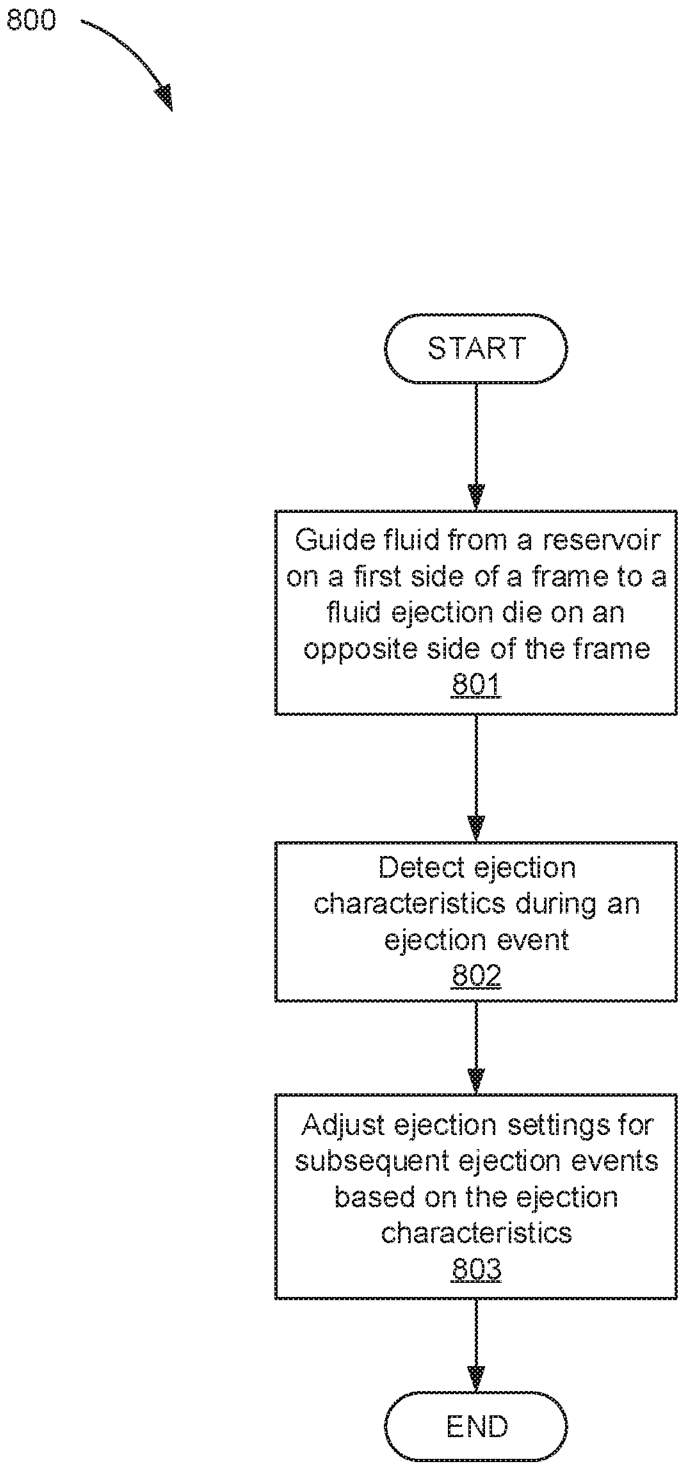
FIG. 8 is a flow chart of a method for adjusting fluidic ejection based on ejection characteristics, according to an example of the principles described herein.

FIG. 8 is a flow chart of a method (800) for adjusting fluidic ejection based on ejection characteristics, according to an example of the principles described herein. According to the method, fluid is guided (block 801) from a reservoir (FIG. 1, 106) of each fluid ejection device (FIG. 1, 104) on a first side of a frame (FIG. 1, 102) to a fluid ejection die (FIG. 1, 108) on an opposite side of the frame (FIG. 1, 102). For example, via the path indicated in FIG. 5, fluid travels from a first side of a frame (FIG. 1, 102) towards a second side of the frame (FIG. 1, 102).

Ejection characteristics are then detected (block 802) during an ejection event. As one particular example, a temperature surrounding the nozzles (FIG. 1, 112) of various fluid ejection die (FIG. 1, 108) is measured. This may be done in any number of ways including sensors (FIG. 7, 728) disposed in the substrate (FIG. 3, 322), either as individual components or integrated with heaters (FIG. 7, 726). Based on the detected characteristics, the characteristics for subsequent ejection events are adjusted (block 803).

In one particular example, detection (block 802) of ejection characteristics includes determining a difference in ejection characteristics across multiple fluid ejection devices (FIG. 1, 104), and adjusting (block 803) the ejection characteristics includes adjusting ejection characteristics to reduce the difference in ejection characteristics across the multiple fluid ejection devices (FIG. 1, 104). That is, as described above, variation in drop volumes may impact well filling, leading to inaccurate results and in some cases may impact the ability to carry out sample analytics. Accordingly, the present method (800) by promoting uniformity across fluid ejection die (FIG. 1, 108) reduces the likelihood of these complications.

Moreover, as described above, adjusting (block 803) ejection characteristics may include heating a portion of the substrate (FIG. 3, 322) that correspond to the fluid ejection devices (FIG. 1, 104), In another example, adjusting (block 803) ejection characteristics may include adjusting an activation pulse passed to fluid actuators of the fluid ejection devices (FIG. 1, 104). In a further example, adjusting (block 803) ejection characteristics may include adjusting a voltage delivered to fluid actuators of the fluid ejection devices (FIG. 1, 104). In yet another example, combinations of activating a heater (FIG. 7, 726) and adjusting an activation pulse may be used to achieve a desired drop volume.

As described above, the detection (block 802) and adjustment (block 803) may be at different levels of granularity. For example, the multiple fluid ejection devices (FIG. 1, 104) for which ejection characteristics are adjusted may be on a single substrate (FIG. 3, 322), i.e., between fluid ejection devices (FIG. 1, 104) on a single substrate (FIG. 3, 322) and/or between nozzles (FIG. 1, 112) of a single fluid ejection die (FIG. 1, 108). In another example, the multiple fluid ejection devices (FIG. 1, 104) for which ejection characteristics are adjusted may be on different substrates (FIG. 3, 322). That is, as fluid ejection die (FIG. 1, 108) at the end of printheads may be cooler than those in the middle, printheads at the edges of the frame (FIG. 1, 102) may be cooler than those in the middle. Accordingly, the method (800) as described herein, allows for adjustment such that nozzles (FIG. 1, 112) within each fluid ejection die (FIG. 1, 108), printhead, and/or frame (FIG. 1, 102) can be adjusted to promote drop volume uniformity.

Such systems and methods 1) improve nozzle-to-nozzle dispensing accuracy of a sample, 2) reduces signal noise; 3) improves sensitivity of the system, which may be relevant in diagnostic applications; and 4) provides finer adjustments to ejection characteristics.

What is claimed is:

1. A fluid ejection system, comprising:

a frame to retain a plurality of fluid ejection devices disposed on the frame, the plurality of fluid ejection devices including a plurality of arrayed open reservoirs and a plurality of arrayed fluid ejection dies, wherein each fluid ejection device is to align with one of a plurality of microwells and comprises:

an open reservoir of the plurality of arrayed open reservoirs disposed on a first side of the frame, the open reservoir including an opening through which fluid is to be filled;

a fluid ejection die of the plurality of arrayed fluid ejection dies disposed on an opposite side of the frame, wherein each fluid ejection die comprises:

a fluid feed slot formed in a substrate to receive the fluid from the reservoir;

an array of nozzles formed in the substrate to eject the fluid into an aligned one of the plurality of microwells;

a first pair of a heater and a temperature sensor, the first pair formed at an end of the fluid ejection die; and a second pair of a heater and a temperature sensor, the second pair formed at an opposite end of the fluid ejection die, wherein the first and second pairs correspond to the fluid feed slot disposed between the first pair and the second pair, and correspond to the array of nozzles in the substrate; and an ejection adjustment system to selectively adjust, based at least in part on an environment temperature and a reading of the temperature sensors of the first and second pairs, an amount of fluid ejected from the fluid ejection devices, using the heaters of the first and second pairs.

2. The fluid ejection system of claim 1, wherein the ejection adjustment system adjusts an amount of fluid ejected to reduce a difference in an amount of fluid ejected between fluid ejection devices.

3. The fluid ejection system of claim 1, wherein each of the temperature sensors of the first and second pairs is to detect a temperature of a portion of the substrate that corresponds to the fluid ejection device; and each of the heaters of the first and second pairs in the substrate is to increase the temperature of the portion of the substrate that corresponds to the fluid ejection device; and wherein the ejection adjustment system includes a controller to transmit control signals for adjusting an amount of fluid ejected from the fluid ejection devices.

4. The fluid ejection system of claim 1, wherein multiple fluid ejection die share a single substrate.

5. The fluid ejection system of claim 1, wherein each fluid ejection device is individually addressable.

6. The fluid ejection system of claim 1, wherein each of the first pair and the second pair is an integrated component of the heater and the temperature sensor.

7. A fluid ejection system, comprising:

a frame to retain a plurality of fluid ejection devices; and a two-dimensional array of fluid ejection devices disposed on the frame, the fluid ejection devices including a plurality of arrayed open reservoirs and a plurality of arrayed fluid ejection dies, wherein each fluid ejection device is to align with one of a plurality of microwells and comprises:

an open reservoir of the plurality of arrayed open reservoirs disposed on a first side of the frame, the open reservoir including an opening through which fluid is to be filled;

a fluid ejection die of the plurality of arrayed fluid ejection dies disposed on an opposite side of the frame, wherein each fluid ejection die comprises:

a fluid feed slot formed in a substrate to receive the fluid from the reservoir and provide the fluid to an array of nozzles formed in the substrate in rows on either side of the fluid feed slot, the array of nozzles to eject the fluid into an aligned array of microwells;

a first pair of at least one sensor and at least one heater, the first pair formed at an end of the fluid ejection die within the substrate; and a second pair of at least one sensor and at least one heater, the second pair formed at an opposite end of the fluid ejection die within the substrate, wherein the fluid feed slot is disposed between the first pair and the second pair, and wherein the at least one sensor of the first and second pairs is to detect a temperature of a portion of the substrate that corresponds to the fluid ejection die, and the at least one heater of the first and second pairs is to heat the portion of the substrate that corresponds to the fluid ejection die such that fluid ejection from the fluid ejection device matches fluid ejection from other fluid ejection devices.

8. The fluid ejection system of claim 7, wherein the at least one heater and the at least one sensor are paired into an integrated component.

9. The fluid ejection system of claim 7, wherein each nozzle ejects fluid on a picoliter scale.

* * * * *